May 15, 1928.
N. T. NELSON
1,669,571
FASTENER FOR BRACELET LINKS
Filed April 8, 1926
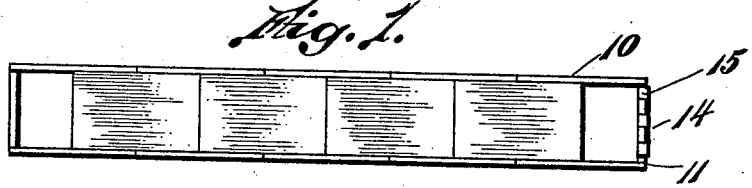
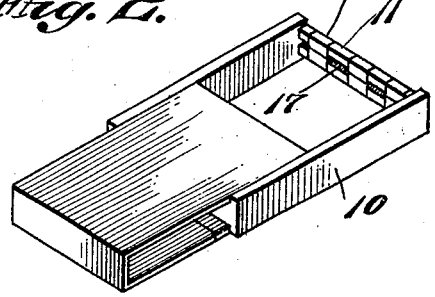
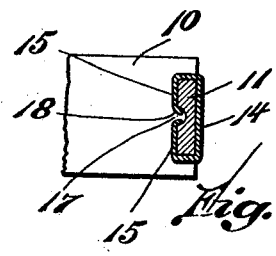
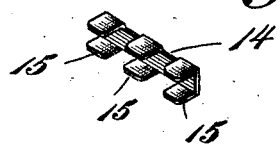
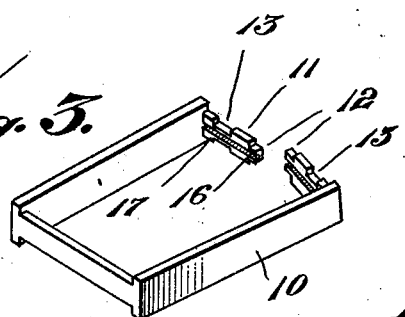
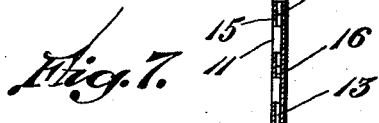
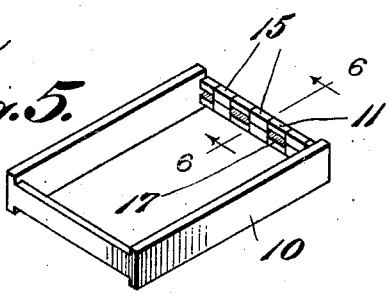
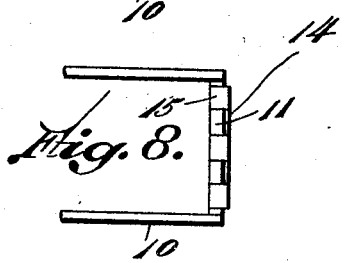
INVENTOR.
Nils T. Nelson.
BY Barlow & Barlow
ATTORNEYS.

Patented May 15, 1928.

1,669,571

UNITED STATES PATENT OFFICE.

NILS T. NELSON, OF ATTLEBORO, MASSACHUSETTS, ASSIGNOR TO J. F. STURDY'S SONS CO., OF ATTLEBORO FALLS, MASSACHUSETTS, A CORPORATION OF MASSACHUSETTS.

FASTENER FOR BRACELET LINKS.

Application filed April 8, 1926. Serial No. 100,634.

This invention relates to a fastener for securing together the ends of bracelet links; and has for its object to provide a bendable clamp which is arranged to extend across the joint at the ends of the link, the clamp being provided with a plurality of spaced pairs of bendable fingers to extend into the corresponding notches formed in the stock of the link at the sides of the joint of the link to bind the ends thereof securely together.

With these and other objects in view, the invention consists of certain novel features of construction, as will be more fully described, and particularly pointed out in the appended claims.

In the accompanying drawings:

Figure 1 is a top view showing one form of extensible box bracelet with the ends of one of the frame-like links secured together by my improved clamp.

Figure 2 is a perspective view illustrating two interlocking bracelet links, one link being of frame shape with its abutting ends secured together by my improved clamp.

Figure 3 is a perspective view showing the frame-shaped link in detail with its ends slightly open or spaced apart and illustrating the notches in the link bar into which the fingers of the clamp extend.

Figure 4 is a perspective view showing one form of my improved clamp member with its plurality of spaced pairs of bendable fingers.

Figure 5 is a perspective view showing one end of the frame and the abutting ends of the frame-shaped link as secured together by my improved clamp.

Figure 6 is an enlarged sectional view on line 6—6 of Figure 5 showing the arms of the clamp as embracing the end bar of the link with its ends turned inwardly in a groove formed in the inner face of the link cross bar.

Figure 7 shows an edge view with the cross bar of the link as recessed to receive the body of the clamp and its fingers flush with the inner and outer faces of the link cross bar, the clamp being shown in section.

Figure 8 is the same as Figure 7 but showing the cross bar of the link as not recessed on either its inner or outer surfaces to receive the bar and fingers of the clamp flush therewith.

It is found in the practical construction and operation of bracelet links, particularly links of the so-called frame shape in which a link is formed of a strip of metal folded into the desired form with its ends abutting, of advantage to provide some simple and effective means for securing these abutting ends together; and to accomplish this in a simple and effective way, I have provided a bendable clamp having a body portion with a plurality of spaced pairs of fingers arranged to fit into correspondingly spaced notches in the cross bar on this link, the fingers being folded to embrace the stock of the bar to securely lock the abutting ends together and the fingers in the notches formed on opposite sides of the joint being adapted to be bent back and opened to permit of separation and removal of the link from the bracelet when desired; and the following is a detailed description of the present embodiment of my invention and showing one construction of clamping device by which these advantageous results may be accomplished:—

With reference to the drawings, 10 designates one of the links of an extensible bracelet which is herein shown as being of the so-called frame construction, the same being formed of stock folded into hollow link form with a cross bar 11 having abutting ends 12. This cross bar is herein shown as being provided with spaced recesses as at 13, on its edge on either side of its abutting ends and is also herein shown as being recessed at 16 at the joint of the abutting ends.

In order to secure together these ends of the link, I have provided a clamping device 14 which is preferably formed of sheet metal having three spaced pairs of bendable fingers 15, the end pairs being adapted to fit into the correspondingly spaced notches 13 in the link and the middle pair to fit into the middle notch 16 of the link at its joint. These fingers being then folded about the bar 11 to embrace their respective portions of the cross bar, the middle fingers are folded over the joint thereof, to close the same and hold these ends in positive alignment, while the end fingers by entering the notches 13 serve to securely lock the frame ends to prevent them from being drawn apart.

In some instances, I provide a longitudinally-disposed groove 17 along the inner face of the link bar 11 into which the extremities 18 of the fingers 15 are bent to more securely lock them in position.

In some instances, the cross bar 11 is recessed as shown in Figure 7, to receive the parts of the body or bar of the clamp flush with its outer surface and the inner surface of the bar is also notched to receive the fingers flush therewith, and in still other instances, the outer and inner surfaces of this cross bar may not be recessed or notched to receive the parts of the clamp, as shown in Figure 8, but in order to enable the clamp to secure the ends of the link together the locking effect of the clamp is much stronger where its fingers are caused to engage some recessed or notched portions in the link.

I have herein shown and described the ends of the link as abutting against each other, but I do not desire to be limited to this exact construction as the ends may be spaced apart if desired and still be locked together in position and in alignment by my improved clamp.

I have defined the fingers as being folded in a plane parallel to the joint but I wish it understood that by this term I include as the joint the entire portion of the extremity of the arm which engages the opposite arm so that this term is sufficiently inclusive to embrace a condition where the ends are beveled or inclined relative to their general longitudinal extent.

The foregoing description is directed solely towards the construction illustrated, but I desire it to be understood that I reserve the privileges of resorting to all the mechanical changes to which the device is susceptible, the invention being defined and limited only by the terms of the appended claims.

I claim:

1. In a bracelet, a frame link formed of folded stock with its end portions extending toward each other to form a joint, each of said end portions being notched at a point spaced from the extremity, a clamp of sheet stock extending along said end portions and covering said joint, fingers on said clamp on each side of said joint positioned in said notches and folded about said end portions in planes parallel to said joint.

2. In a bracelet, a frame link formed of folded stock with its end portions extending toward each other to form a joint, each of said end portions being notched at its extremity and at a point spaced therefrom, a clamp of sheet stock extending along said end portions and covering said joint, fingers on said clamp extending about said joint and other sets of fingers on said clamp positioned each side of said joint, all of said fingers interlocking with said notches and folded about the end portions in planes parallel to said joint.

In testimony whereof I affix my signature.

NILS T. NELSON.

CERTIFICATE OF CORRECTION.

Patent No. 1,669,571.  Granted May 15, 1928.

It is hereby certified that the name of the patentee in the above numbered patent is erroneously written and printed as "Nils T. Nelson", whereas said name should have been written and printed as "Nels T. Nelson"; and that the said Letters Patent should be read with this correction therein that the same may conform to the record of the case in the Patent Office.

Signed and sealed this 19th day of June, A. D. 1928.

(Seal)

M. J. Moore,
Acting Commissioner of Patents.